Aug. 23, 1955 L. C. FRAZIER 2,715,933
TIRE BUILDING DRUM (INDUSTRIAL TYPE)
Filed March 4, 1953 7 Sheets-Sheet 1
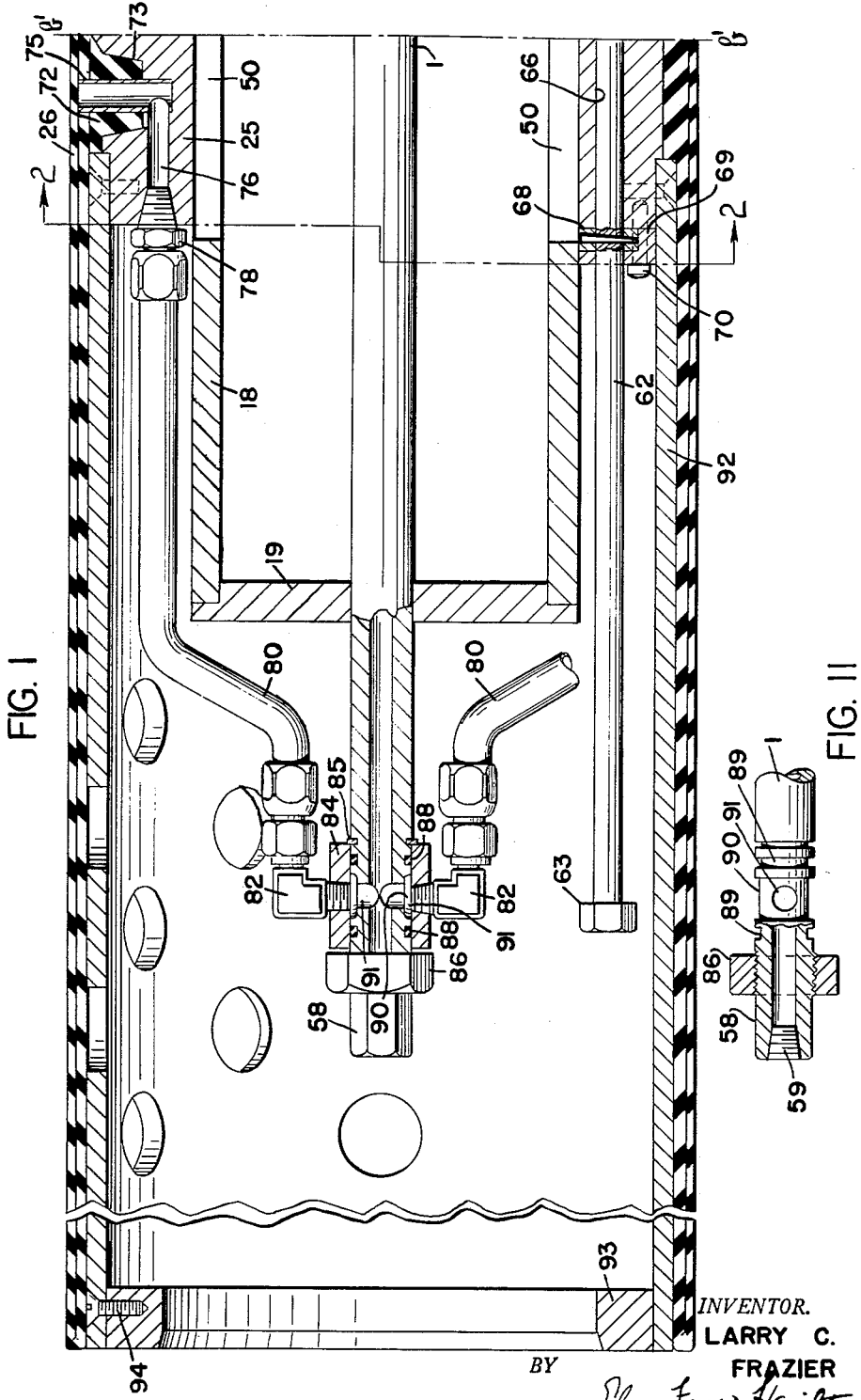
INVENTOR.
LARRY C. FRAZIER
BY
Ely, Frye & Hamilton
ATTYS.

Aug. 23, 1955

L. C. FRAZIER 2,715,933

TIRE BUILDING DRUM (INDUSTRIAL TYPE)

Filed March 4, 1953

INVENTOR.
LARRY C. FRAZIER
ATTYS.

INVENTOR.
LARRY C. FRAZIER
BY *Cly. Frye & Hamilton*
ATTYS.

Aug. 23, 1955    L. C. FRAZIER    2,715,933
TIRE BUILDING DRUM (INDUSTRIAL TYPE)
Filed March 4, 1953                 7 Sheets-Sheet 4
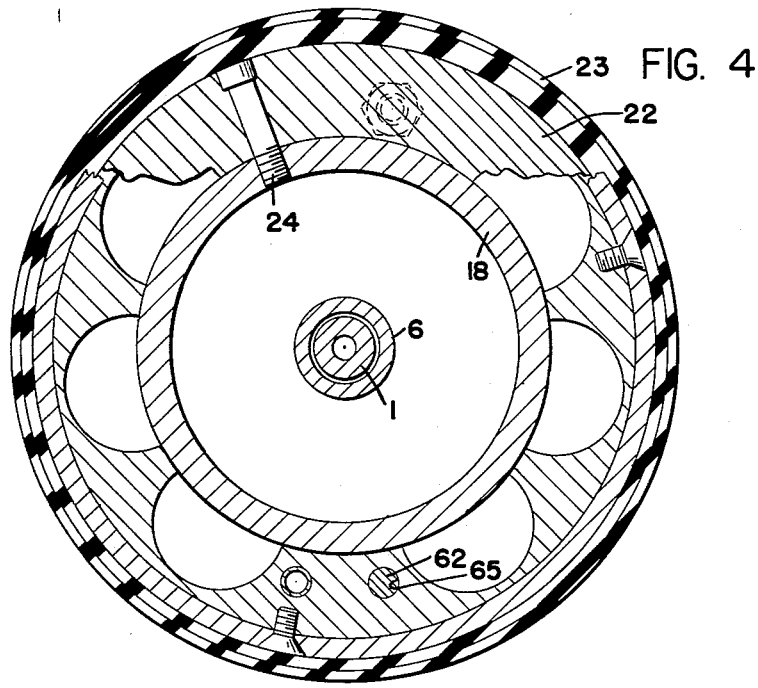
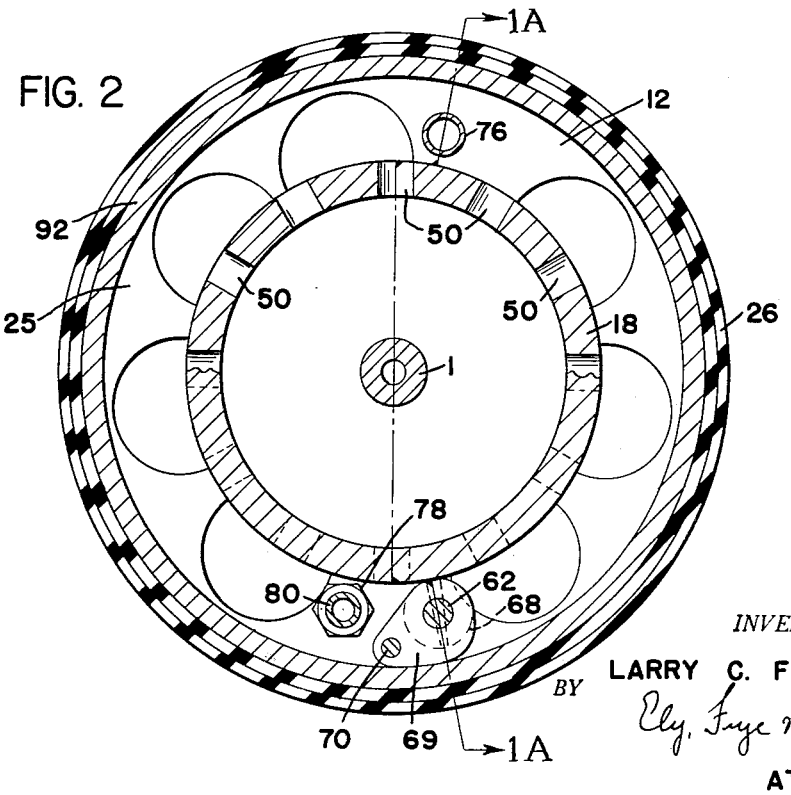
INVENTOR.
LARRY C. FRAZIER
BY
ATTYS.

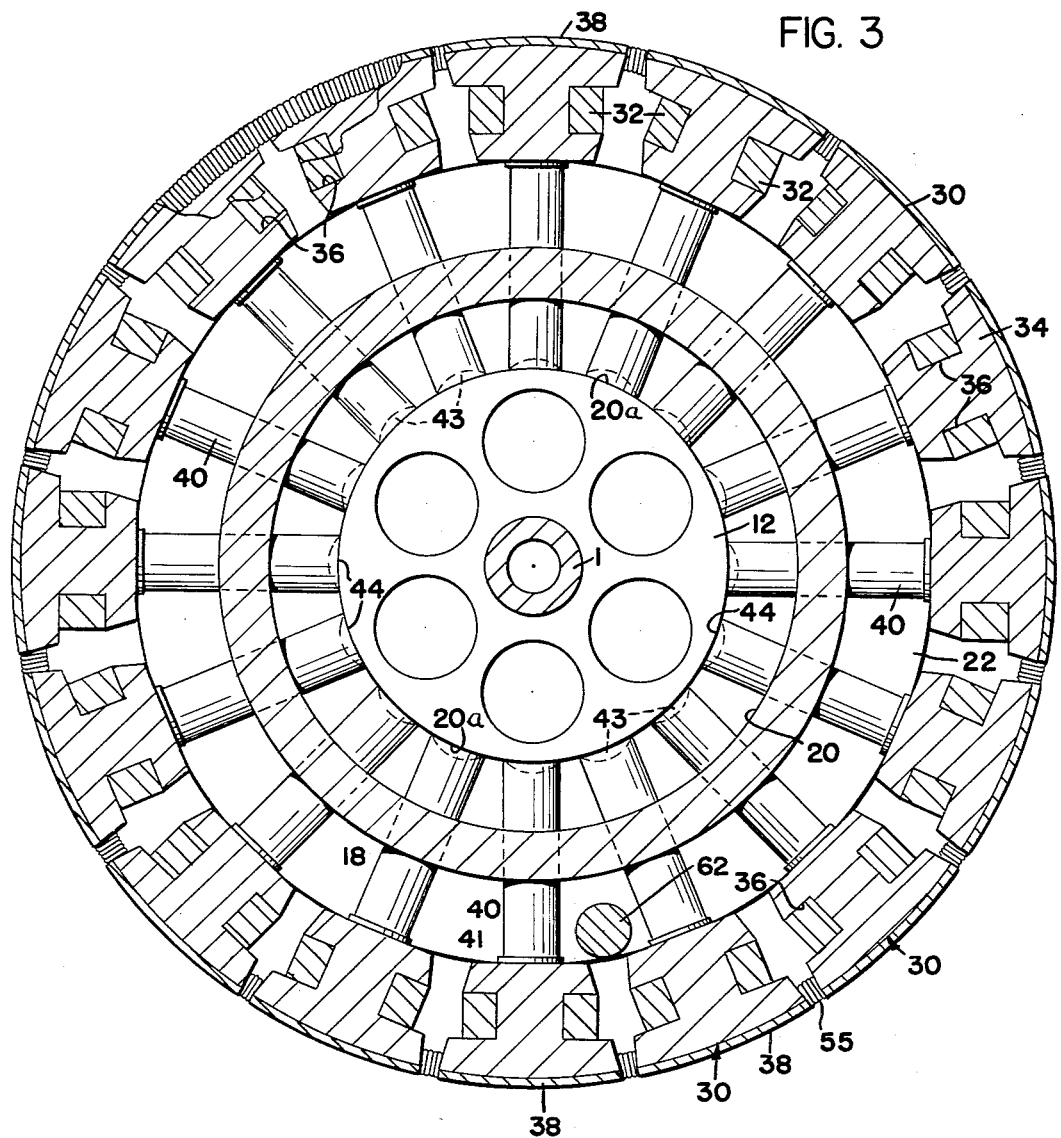

Aug. 23, 1955    L. C. FRAZIER    2,715,933
TIRE BUILDING DRUM (INDUSTRIAL TYPE)
Filed March 4, 1953    7 Sheets-Sheet 6
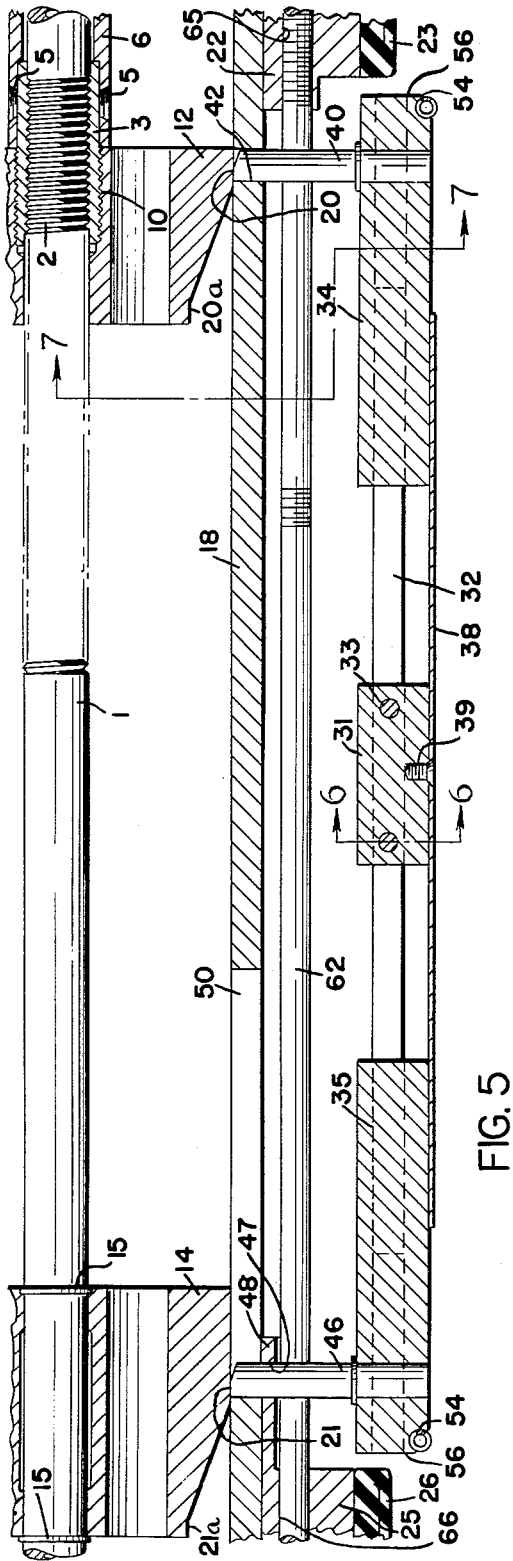
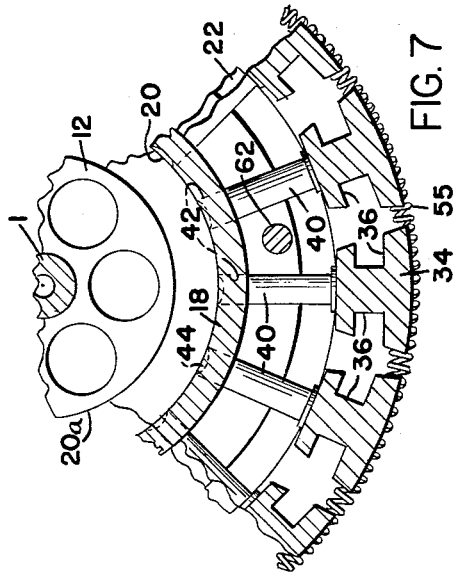
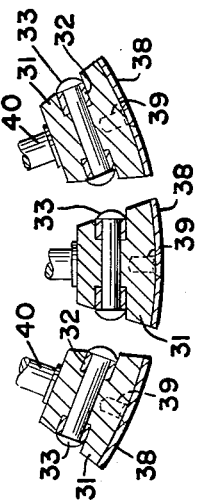
INVENTOR.
LARRY C. FRAZIER
BY
ATTYS.

United States Patent Office 2,715,933
Patented Aug. 23, 1955

2,715,933

TIRE BUILDING DRUM (INDUSTRIAL TYPE)

Larry C. Frazier, Niles, Mich., assignor, by mesne assignments, to The Goodyear Tire & Rubber Company, a corporation of Ohio Application March 4, 1953, Serial No. 340,290

16 Claims. (Cl. 154—9)

The present invention relates to the construction of tire building drums such as used in the manufacture of tires by the so-called "flat band" process. The drum shown and described herein is particularly adapted and intended for the manufacture of what are known as "industrial tires." Tires of this type are characterized by small bead diameters and relatively large cross sections which cause the bands from which these tires are made to be elongated cylinders of small diameters.

It will be understood that while the drum shown and described herein is especially made for the manufacture of tire bands which are of the so-called "industrial" type, the principles of the invention are not by any means limited to this particular field but may be used in the manufacture of other types of tires.

The drum shown and described is primarily intended for use with the apparatus and process covered in applicant's prior Patent Nos. 2,440,662, April 27, 1948, and 2,565,071, August 21, 1951. It will be understood, however, that certain aspects of the invention are not restricted to that field but some of the improvements in tire building drums shown herein may be used with other methods and apparatus for tire building.

One object of the invention is to improve upon the drum designs of the prior art so as to give a maximum adjustability to the drum to adapt it to the building of tires having a great range of cross sectional dimensions with a small bead diameter. Other objects of the invention are to simplify the operation of the drum and reduce the cost and labor.

In the drawings and description, the best known and preferred form of the invention is shown and described in the manner in which it has been put into actual service. This, however, does not mean that the invention is restricted to the specific form shown as it may be embodied in other forms and be modified and improved upon without departing from the invention or sacrificing any of the benefits thereof.

In the drawing:

Fig. 1 is a vertical section along the axis of the tire building unit at the left hand or outboard side thereof. This shows the left hand fabric folding and shaping tube.

Fig. 2 is a transverse vertical section on the line 2—2 of Fig. 1.

Fig. 3 is a similar vertical section on the line 3—3 of Fig. 1A showing the drum in its collapsed condition.

Fig. 4 is a vertical section on the line 4—4 of Fig. 1A.

Fig. 5 is a sectional view along the axis of the drum showing the maximum bead setting or drum width and the drum expanded.

Figs. 6 and 7 are sections on the lines 6—6 and 7—7 respectively of Fig. 5.

Figure 8:
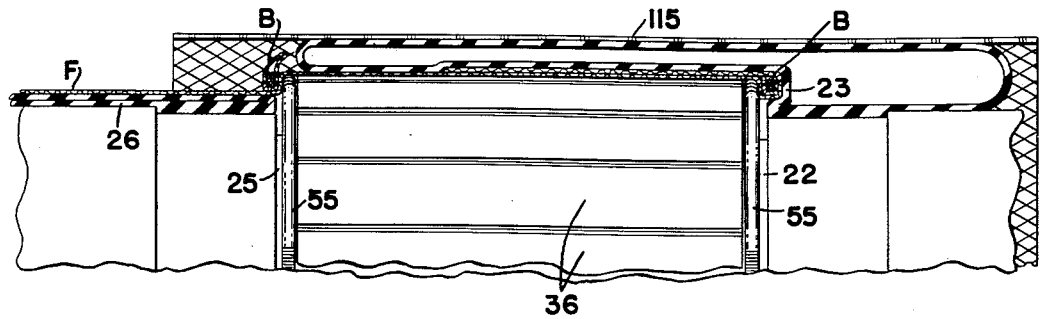
Figure 9:
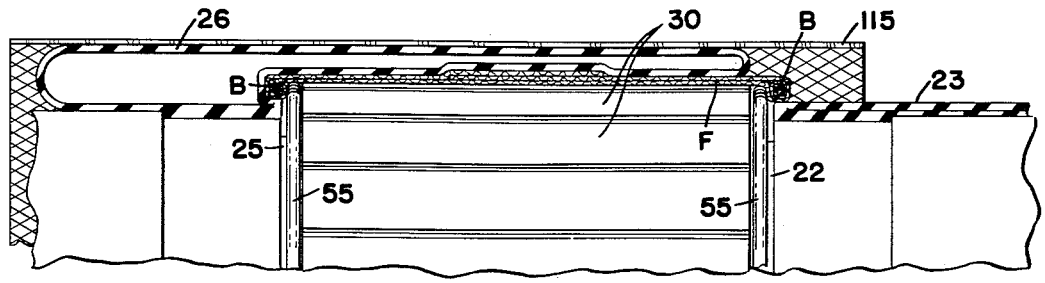

Figs. 8 and 9 are views showing the manner in which the drum is used with the fabric folding and shaping tubes and the cage as in my prior patents, to fold and shape the skirts of the tire fabrics over the beads and over the central portion of the drum.

Figure 10:
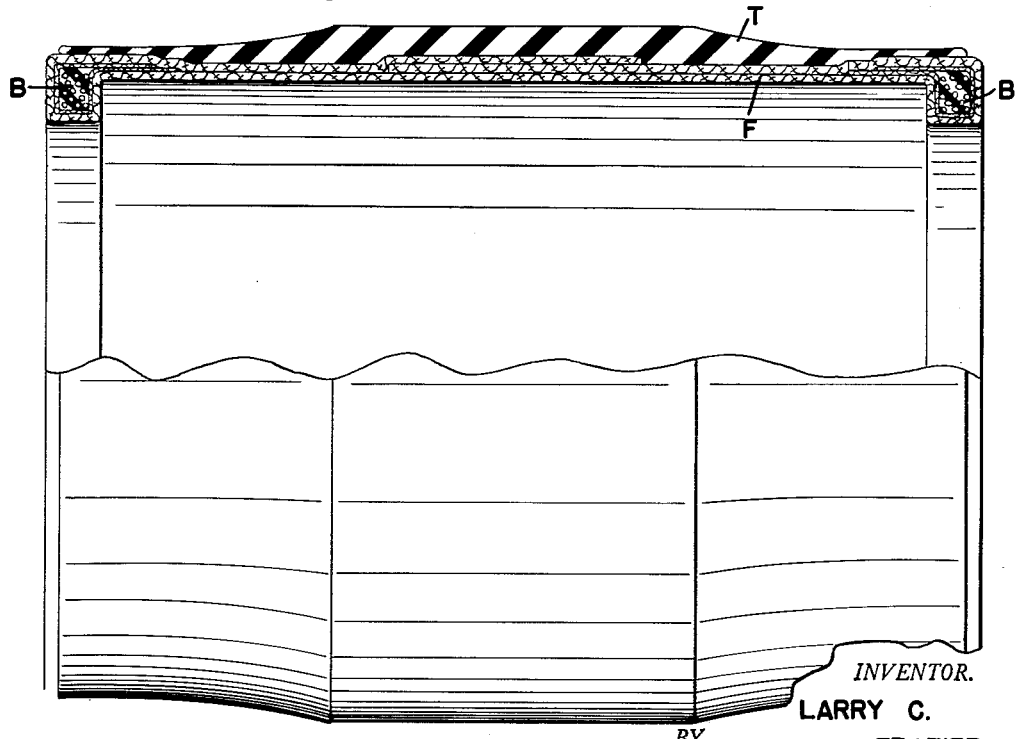

Fig. 10 is a view of a complete band with tread, removed from the building drum.

Fig. 11 is a detail at the outboard end of the main drum shaft.

As will be evident from the several drawings, the tire building unit is very long and is fully supported at the right hand side of the machine so that no support is required for the outboard end of the unit. This permits the finished tire band to be removed from the unit without requiring a shiftable tailstock for the building unit.

Figure 1A:
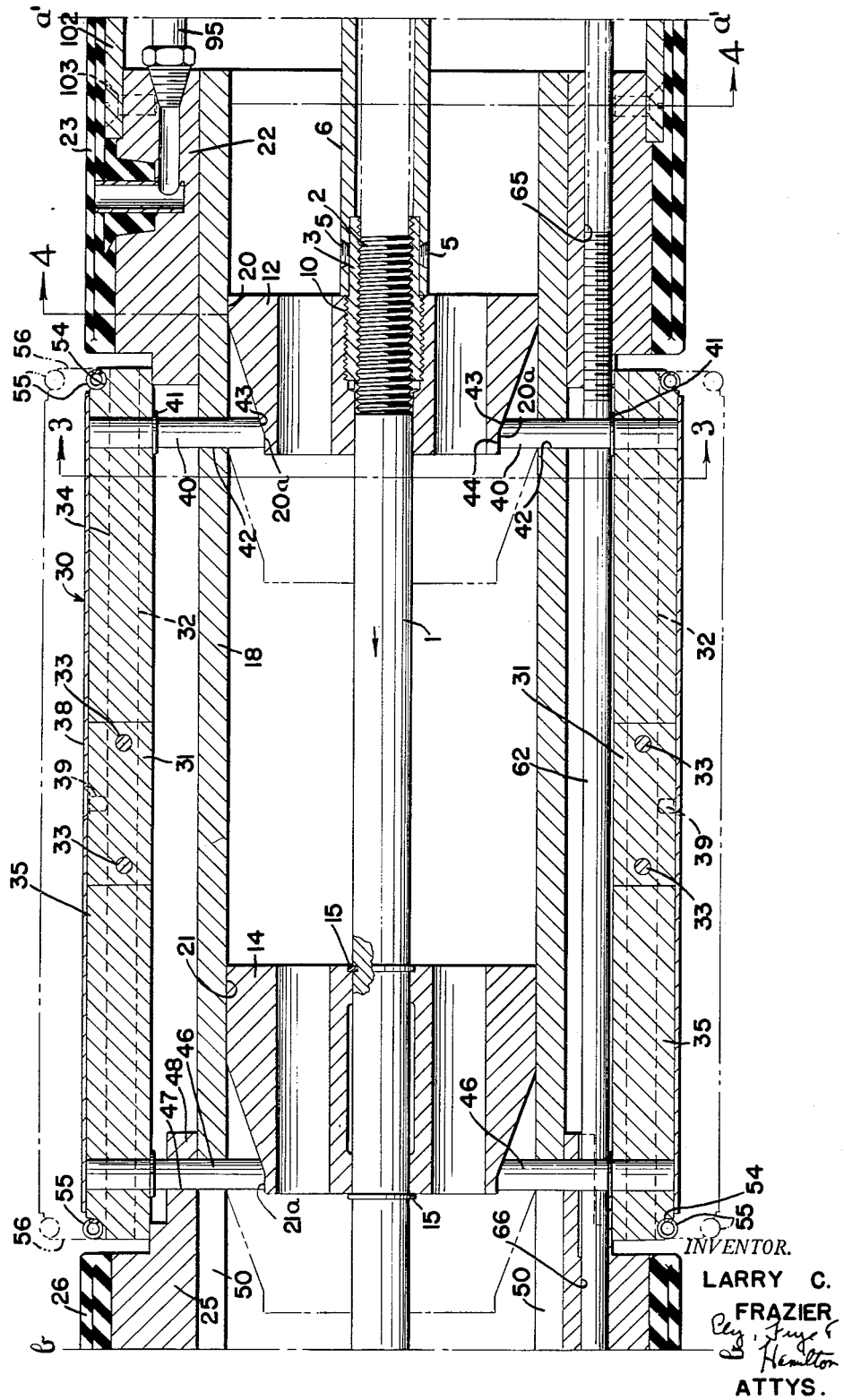
Fig. 1A is a similar section through the tire building drum proper. The view is taken on the line 1A—1A of Fig. 2 with the drum reduced to its minimum width or bead setting.
Figure 1B:
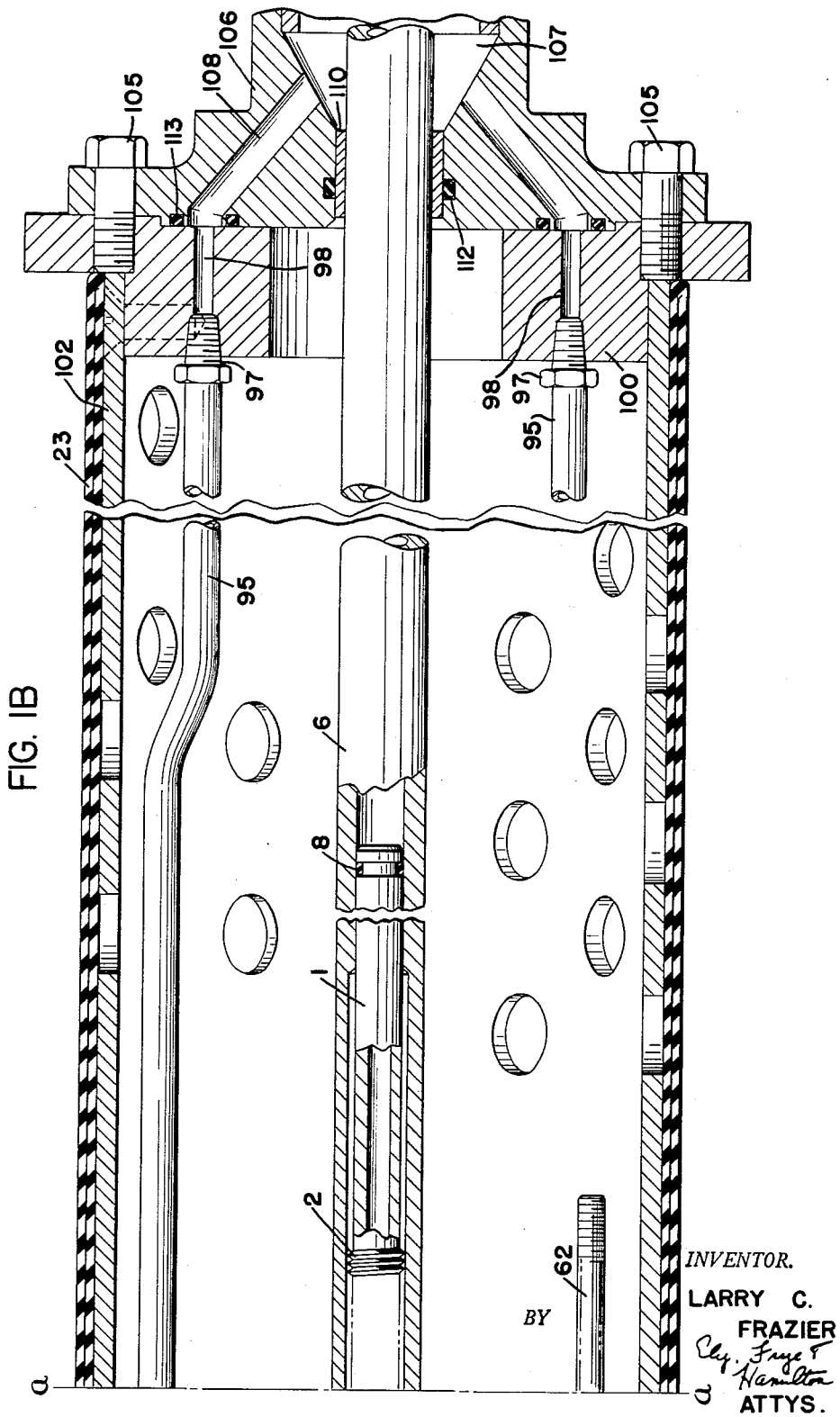
Fig. 1B is a similar section through the right hand or inboard side of the unit showing the inboard fabric folding and shaping tube.

The three views, 1, 1A and 1B are continuations of each other, the lines a—a, and a'—a', and b—b and b'—b' appearing on Fig. 1B and on Fig. 1A and Fig. 1, respectively, denoting the division points of the several figures. The drum overhangs the support for such a distance that wherever possible to do so parts of the drum are made of aluminum so as to reduce the leverage on the supporting shaft.

Centrally of the drum is the main shaft 1 which is hollow throughout so as to conduct air under pressure to the outboard folding and shaping tube. At its inner end the shaft is threaded as shown at 2 for a substantial distance, somewhat in excess of the maximum variation in bead sets which may be provided. In practical embodiments of the invention there may be as much as 4½ inches difference in bead sets, i. e., the distance from shoulder to shoulder of the building drum. The shaft 1 is threaded over a somewhat longer distance.

Engaging the threaded portion of the shaft 1 is a sleeve 3 which is fixed by set screws 5 in the outboard end of a long tubular shaft 6 which extends to the stand or support on which the drum building unit is carried, which is at the right of Fig. 1B and is not shown. Any suitable means, not shown, is provided for rotating the shaft 6 and with it the entire drum building unit. The shaft 6 is also shiftable longitudinally by hand or by pneumatic means relative to the drum building unit and is slidable in bearings at the ends of the drum support. The purpose of this movement is to move the cones and thereby the posts radially outward. In my prior Patent No. 2,565,071, a suitable hand lever is shown for the purpose, although an equivalent power cylinder is preferred. All of these details may be readily supplied by one familiar with my prior patents and need not be shown.

The bore through the shaft 6 is reduced as shown in Fig. 1B to receive the inner end of the shaft 1 with a close sliding fit and at this point a packing ring 8 is set in the shaft 1 to make a fluid tight seal. The inner end of the shaft 6 is connected to a valve controlled supply line for fluid pressure to operate the outboard folding tubes.

The sleeve 3 projects beyond the end of the shaft 6 and is threaded as shown at 10 to engage a threaded portion of a bore through the center of an inboard spreader or drum expanding cone 12. The outer end of the cone 12 has a sliding fit about the adjacent unthreaded portion of the shaft 1.

At an intermediate point along the shaft 1 is the second or outboard spreader or expanding cone 14 which is fixed on the shaft by two split rings 15 seated in grooves in the shaft. The cones 12 and 14 are shown as cored out for reducing the weight.

Surrounding and spaced from the shaft 1 is a long cylinder 18 having its outboard end closed by a plate 19 that has a sliding fit with the main shaft 1. The inner surface of the cylinder has a sliding fit with the machined surfaces 20 and 21 on the bases of the cones 12 and 14 respectively. This cylinder supports on its inboard end and is fixed by bolt 24 to a ring-shaped bearing member 22 of the inboard auxiliary drum for the inboard folding and shaping tube 23. Spaced outwardly of the member 22 is a second bearing member 25 of the outboard auxiliary drum for the outboard folding and shaping tube 26, but the member 25 has a sliding fit along the cylinder 18.

Surrounding the cylinder 18 are the several longitudinal slats or staves 30 which, together, constitute the tire building drum proper. As shown in Fig. 3, sixteen of these staves make up a complete tire building surface, but this number is optional and may be varied as desired. As shown more in detail in Figs. 1A, 3 and 5, each stave 30 is composed of a relatively short central section 31 to the sides of which are secured long fingers or bars 32 which extend on either side of the central section and are held on the section by pins 33. Flanking the central section of each stave is an end section which is considerably longer than the central section. The inboard end section is given the numeral 34 and the outboard end section the numeral 35. In the sides of each end section are the grooves 36 in which the bars 32 have a close sliding fit. Attached to the central section and overlapping the end sections are the long metal cover plates 38 which are fastened at their centers to the central sections 31 by screws 39 and extend and fit closely over the end sections. As shown in the several views the outer surfaces of all of the stave sections are curved and the cover plates are likewise formed on an arc so that the outer surface of the building drum both in retracted and expanded condition approaches very closely a true cylinder.

When the several stave sections are contracted along the axis of the building drum to the minimum bead setting, as in Fig. 1A, they are in contact and the cover plates overlap all but the extreme outer ends of the end sections. When the building drum is fully expanded as shown in Fig. 5, the plates 38 effectively cover the gaps between the central sections and the end sections of the staves.

The inboard ends of the staves are supported by posts 40 resting upon the cone 12. Each inner end section 34 is supported on the outer end of a post by a collar 41. The several posts pass through and are guided in holes 42 formed radially about the cylinder 18. The inner end of each post is formed with an inclined surface 43 which will slide over the tapered surface of the cone 12 and with a flat surface 44 which will rest upon the surface 20 of the cone when the drum is expanded as shown in Fig. 5 or on a ledge 20a at the small end of the cone when the drum is contracted.

The outboard end sections are supported in a similar manner on radial posts 46 which slide over the tapered surface of the cone 14 during expansion or contraction of the drum, or rest upon the cylindrical surfaces 21 and 21a at the ends of the cone 14.

It will be noted that the posts 46 pass through and are guided in radial holes 47 located in a reduced flange 48 on the inner end of the outboard tube member or element 25, where it underlies the outboard ends of the staves. The posts are received in long slots 50 cut in the cylinder 18, it being noted that when the drum is set at the minimum bead setting the posts are at the inboard ends of the slots and when the drum is at its maximum setting the posts are at the outboard end of the slots. The posts 46 connect the outboard stave sections to the member 25 so that as the width of the drum is altered, the outboard folding and shaping tube will move with it.

In the outer edges of the end stave sections are the grooves 54 which, together, form two circumferential grooves about the drum in which the endless circumferential springs 55 are seated. These springs exert sufficient tension to hold the several staves in circular or drum form with the posts 40 and 46 resting upon the cones in all positions of adjustment. When the drum is expanded as shown in dotted lines in Fig. 1A and in full lines in Fig. 5 by the movement of the shaft 1 in the direction of the arrow in Fig. 1A, the end surfaces of the stave sections constitute shoulders 56 which form the abutments for setting the beads.

The outboard folding tube is moved with the outer stave ends 43 to adjust the drum width by means of the posts 46 which connect the element 25 and the stave ends. Located at one side of the axis of the drum is the long rotatable shaft 62, the outboard end of which is provided with the head 63 by which it is turned. The shaft 62 extends into the inboard tube supporting element 22, being threaded for a substantial distance into a threaded bore 65 in the element 22, sufficient to provide for the maximum adjustment of the building drum. The shaft 62 is rotatably received in a bore 66 in the outboard tube element or member 25 and at the point where the shaft passes out of the element 25 a collar 68 is pinned to the shaft and held against the end of the part 25 by a plate 69 fitting around the shaft and against the collar, and held in position by a bolt 70 threaded into the end of the element 25.

By rotating the shaft 62 the width of the drum is adjusted by shifting of the element 25, which through the posts 46 moves the end stave sections. After this adjustment the several central sections 31 may be shifted along with their associated cover plates 38 by hand so that the cover plates overlap the end sections 34 and 35 an equal distance, as shown in Fig. 5.

To adjust the spacing of the cones to the adjusted width of the building drum to thereby position the cones in the same relative positions with respect to the posts as in Fig. 1A, the shaft 1 is rotated with respect to the shaft 6, which, through the threaded connection at 3, moves the outer end of the shaft 1 along its axis. As the shaft moves, the cone 14 is likewise moved and movement is continued until the two cones are operated to the adjusted width of the drum and posts. To turn the shaft 1, its outboard end is formed with the hexagonal surface 58. A plug 59 closes the outer end of the passage in the shaft.

The outboard folding tube 26 is supported at its inner end on the element 25, being located thereon by blocks 72, the inner ends of which are tapered to fit sockets 73 in the element 25 (Fig. 1). Two of these blocks are provided at diametrically opposite points. The underside of the folding tube is thickened at this point as shown in Figs. 1 and 1A. An inflating tube 75 is fitted in each block 72 and conducts air to the interior of the tube, being in communication with the passage 76 in the outer end of which is threaded the pipe coupling 78. The couplings 78 are connected to flexible hose 80 which extend to points near the outer end of the shaft where they are attached to angular fittings 82 which are threaded into a collar 84 rotatably mounted on the shaft and held at one side by the locking ring 85 and at the other by nut 86 threaded on the end of the shaft 1. O-rings 88 seated in grooves 89 seal the collar 84 and the shaft against leakage of air pressure. Between the grooves 89 the shaft is provided with a channel 90 and radial holes 91 conduct air pressure from the center of the shaft to the channel and thence to the outboard shaping and folding tube. The tube is supported on a long cylinder 92 which is attached to the element 25 and to an outer ring 93 by screws 94. For lightness this cylinder is made of aluminum and is preferably apertured as shown.

The inboard shaping and folding tube 23 is mounted on the stationary element 22 by similar means shown in Fig. 1A. The conduits which conduct pressure to the inboard tube are indicated at 95, being received at their inner ends through couplings 97 in passages 98 through a ring shaped end piece 100. The inboard tube is supported on a cylinder 102 similar to the cylinder 92 and is held by screws 103 threaded into the element 22 and the end piece 100.

To the inboard face of the part 100 is attached by bolts 105 the base of a cylinder 106 having a central chamber 107 to receive air under pressure, which is conducted to the passages 98 by the passages 108.

The shaft 1 passes through the cylinder 106 and has a bearing sleeve 110 which is sealed by an O-ring 112. O-rings 113 seal the face of the end piece 100 against the base of the cylinder.

It will be understood that in order to carry on the method of folding and applying the skirts of the fabric about the drum, separate controls will be provided to admit and withdraw air from the two folding and shaping tubes. A cage such as used in my former patents is shown at 115. The cage is shifted to the various positions by mechanism not shown.

Automatic means such as shown in Patent No. 2,565,071 may be employed to shift the cage and to control the valves which inflate or deflate the tubes 23 and 26 at the proper times.

In building a tire, a layer of fabric F is wrapped about the drum and spliced. This may be a single layer of rubberized cord fabric or it may be a multiple ply depending upon the number of plies desired in the completed tire. When the fabric is applied, the main building drum is in the collapsed position shown in Fig. 1A, and the fabric is of a width which will extend a substantial distance beyond the edges of the drum proper and onto the two folding tubes at either side. The extent of overlap or skirt width will be determined by the extent of overlap to be desired beneath the crown of the tire.

After the fabric is applied to the drum and properly spliced, the drum is expanded by moving the shaft 1 to the left, which causes all of the staves to move outwardly to the dotted line position of Fig. 1A. This action will expose the ends of the staves to form the bead setting shoulders. The beads B of standard construction are then moved against the shoulders either by hand or by setting rings. The cage 115 now goes through its functions, folding the skirts of the fabric from first one side and then the other, over the beads, as shown in Figs. 8 and 9. The tread T is then applied and pressed onto the fabric and the tire band is completed. The drum is then contracted and the band removed. The operations of the drum, the cage and inflation and deflation of the folding tubes may be done automatically by suitable time control mechanism so that the only operations required of the workman are the application of the fabric to the drum, the setting of the beads, application of tread, and removal of the finished band.

The description has been quite detailed but it will be understood that details may be varied and modified within the scope of the invention.

What is claimed is:

1. A tire building drum comprising a plurality of longitudinal staves forming the tire building surface, each of said staves being made of sections telescopically arranged, radial posts at the ends of said staves extending toward the axis of the drum, mechanically operated expanders on the interior of the drum having surfaces against which the inner ends of the posts rest, means to move said expanders along the axis of the drum to expand the drum circumferentially, and means connected to all of said staves to vary the length of all of said staves simultaneously.

2. A tire building drum comprising a plurality of longitudinal staves forming the tire building surface, each of said staves being made of sections telescopically connected, an auxiliary drum at one side of the building drum, a radial post at each end of a stave, cone shaped spreaders at the axis of the drum against which all of the radial posts rest, means for moving the cones jointly along the axis to expand or contract the building drum, means for moving the auxiliary drum and the adjacent stave sections to increase the width of the drum, and means to separate the cones to compensate for the increase in drum width.

3. A tire building drum comprising a plurality of longitudinal staves forming the tire building surface, each of said staves being made of sections telescopically connected, a radial post for each section of each stave, cones at the axis of the drum against which the inner ends of the posts bear, means for moving one set of stave sections relatively to the other to vary the width of the drum, and means for moving the cone for the posts of that set of staves along the axis of the drum independently of the other cone.

4. A tire building unit comprising a plurality of longitudinal staves forming the tire building surface, each of said staves being made of sections telescopically connected, an inwardly extending radial post for each section of each stave, said posts being arranged in two sets each at one end of the drum, a spreader at the axis of the drum for each set of posts, means to move all of said stave sections relatively to one another to vary the width of the drum, and means to move the spreaders relatively to one another to conform to the width of the drum.

5. A tire building unit comprising a plurality of longitudinal staves forming the tire building surface, each of said staves being made of sections telescopically connected, an inwardly extending radial post for each section of each stave, said posts being arranged in two sets each at one end of the drum, cones at the axis of the drum, the inner ends of the posts of each set bearing on a cone, means to expand the staves to increase the width of the drum, and means to separate the cones to conform to the increase in drum width.

6. A tire building drum comprising a plurality of longitudinal staves forming the tire building surface, each stave composed of a relatively fixed section and a movable section telescopically connected thereto, a plurality of inwardly extending radial posts secured to the fixed stave sections, and a plurality of inwardly extending radial posts secured to the movable stave sections, an expander for each set of radial posts, means for moving the expanders jointly for increasing or decreasing the circumference of the drum, and means for moving the movable stave sections and the expander therefor to equal extents for varying the width of the drum.

7. A tire building drum comprising a plurality of longitudinal staves forming the tire building surface, each stave composed of a relatively fixed section and a movable section telescopically connected thereto, a plurality of inwardly extending radial posts secured to the fixed stave sections, and a plurality of inwardly extending radial posts secured to the movable stave sections, a cone for each set of radial posts, means for moving the cones jointly for increasing or decreasing the circumference of the drum, and means for moving the movable stave sections and the cone therefor, to equal extents for varying the width of the drum.

8. A tire building drum comprising a plurality of longitudinal staves forming the tire building surface, each stave composed of a relatively fixed section and a movable section telescopically connected thereto, a plurality of inwardly extending radial posts secured to the fixed stave sections and a plurality of inwardly extending radial posts secured to the movable stave sections, an expander for each set of radial posts, means for moving the expanders jointly for increasing or decreasing the circumference of the drum, means for moving the movable stave sections and the expander therefor to equal extents for varying the width of the drum, and an auxiliary drum adjacent the movable stave sections and movable therewith.

9. A tire building drum comprising a plurality of longitudinal staves forming the tire building surface, each stave composed of a relatively fixed section and a movable section telescopically connected thereto, a plurality of inwardly extending radial posts secured to the fixed stave sections and a plurality of inwardly extending radial posts secured to the movable stave sections, a cone for each set of radial posts, means for moving the cones jointly for increasing or decreasing the circumference of the drum, means for moving the movable stave sections and the cone therefor to equal extents for varying the width of the drum, and an auxiliary drum adjacent the movable stave sections and movable therewith.

10. A tire building drum comprising a plurality of longitudinal staves forming the tire building surface, each stave composed of two sections telescopically connected, two sets of radially inwardly extending posts attached to the ends of the staves, two expanders against which the inner ends of the posts bear, a sleeve surrounding the expanders, longitudinal slots in the sleeve to receive one set of posts, means to move one expander relatively to the other and to move the stave sections relatively to each other to vary the width of the drum.

11. A tire building drum comprising a plurality of longitudinal staves forming the tire building surface, each stave composed of two sections telescopically connected, two sets of radially inwardly extending posts attached to the ends of the staves, two cones against which the inner ends of the posts bear, a sleeve surrounding the cones, longitudinal slots in the sleeve to receive one set of posts, and means to move one cone relatively to the other and to move the stave sections relatively to each other to vary the width of the drum.

12. A tire building unit comprising a tire building drum and an auxiliary drum at one side of the main drum, a plurality of longitudinal staves comprising the outer surface of the tire building drum, each of said staves composed of sections telescopically connected, one set of stave sections being movable relatively to the other to vary the width of the drum, posts at the ends of the stationary stave sections and posts at the ends of the movable stave sections, a cone against which the inner ends of each set of posts bear, the posts of the movable stave sections being connected to the auxiliary drum, means to move the auxiliary drum and the stave sections connected therewith to vary the width of the drum, means to move the cone for the movable stave sections to conform to the position of the movable stave sections, and means to move the two cones simultaneously to vary the circumference of the drum.

13. A tire building drum comprising a plurality of longitudinal staves forming the tire building surface, each of said staves being made of sections telescopically arranged, mechanically operated expanders in the interior of the drum, yielding means to urge the staves toward the expanders, means to move the expanders to vary the circumference of the drum, and means connected to all of the staves to vary their lengths simultaneously and to equal extents.

14. A tire building drum comprising a plurality of longitudinal staves forming the tire building surface, each of said staves being made of sections telescopically arranged, mechanically operated cones in the interior of the drum, yielding means to urge the staves toward the cones, means to move the cones to vary the circumference of the drum, and means connected to all of the staves to vary their lengths simultaneously and to equal extents.

15. A tire building drum comprising a plurality of longitudinal staves forming the tire building surface, each of said staves being made of sections telescopically arranged, mechanically operated expanders in the interior of the drum, yielding means to urge the staves toward the expanders, means to move the expanders to vary the circumference of the drum, means connected to all of the staves to vary their lengths simultaneously, and means to move the expanders relatively to one another to compensate for variations in drum width.

16. A tire building drum comprising a plurality of longitudinal staves forming the tire building surface, each of said staves being made of sections telescopically arranged, mechanically operated cones in the interior of the drum, yielding means to urge the staves toward the cones, means to move the cones to vary the circumference of the drum, means connected to all of the staves to vary their lengths simultaneously, and means to move the cones relatively to one another to compensate for variations in drum width.

References Cited in the file of this patent

UNITED STATES PATENTS

| | | |
|---|---|---|
| 1,954,764 | Anderson | Apr. 10, 1934 |
| 2,039,531 | Heston | May 5, 1936 |
| 2,339,543 | Bishop | Jan. 18, 1944 |
| 2,565,071 | Frazier | Aug. 21, 1951 |